F. W. STRAEHLE.
FLOATING TOOL HOLDER.
APPLICATION FILED MAY 8, 1920.
1,369,491.
Patented Feb. 22, 1921.
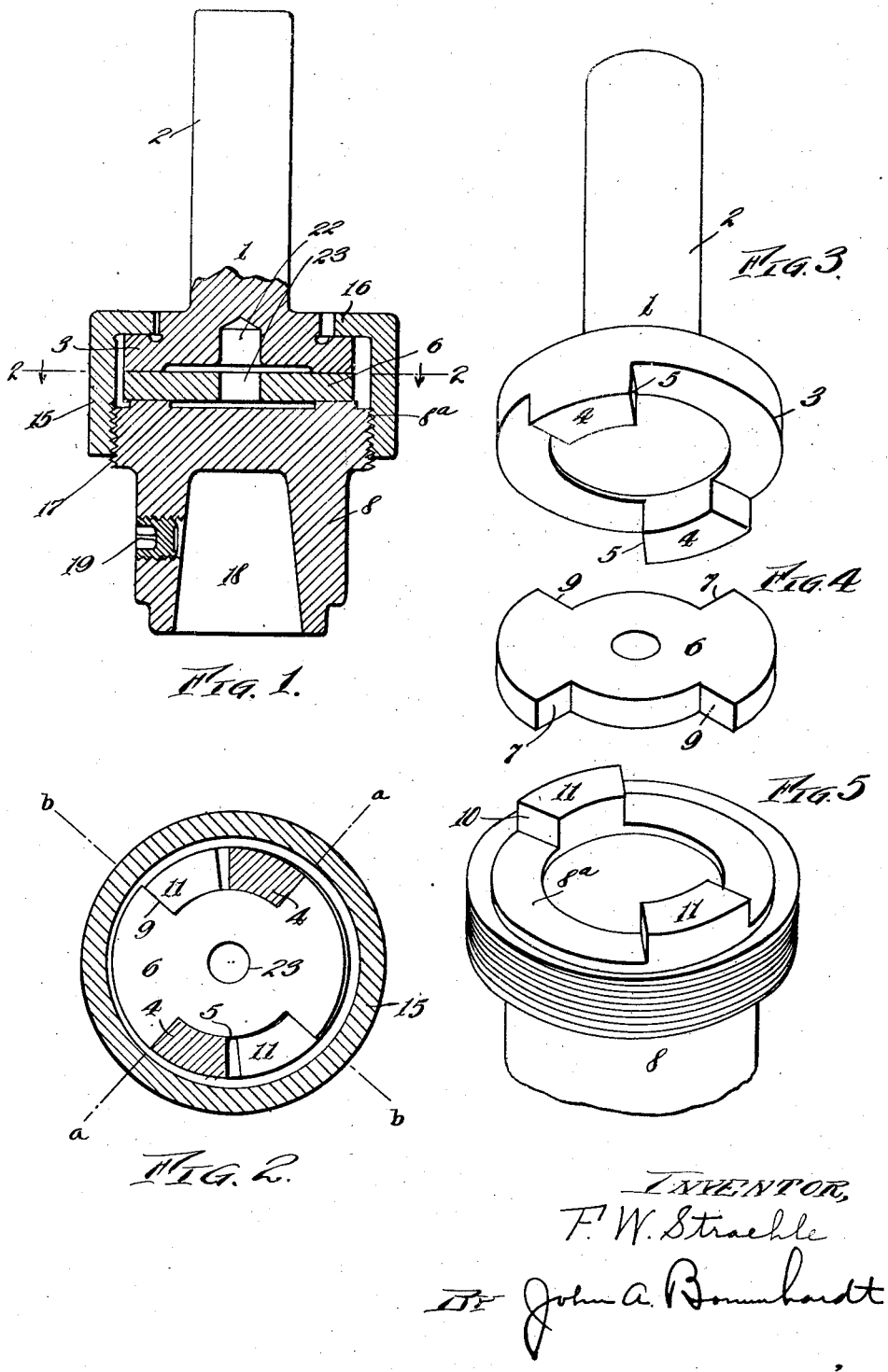

UNITED STATES PATENT OFFICE.

FREDERICK W. STRAEHLE, OF CLEVELAND, OHIO.

FLOATING-TOOL HOLDER.

1,369,491.　　　　　Specification of Letters Patent.　　Patented Feb. 22, 1921.

Application filed May 8, 1920. Serial No. 379,828.

*To all whom it may concern:*

Be it known that I, FREDERICK W. STRAEHLE, a citizen of the United States, residing at Cleveland, in the county of Cuyahoga and State of Ohio, have invented certain new and useful Improvements in Floating-Tool Holders, of which the following is a specification.

This invention relates to an improved construction in floating tool holders and has for its object to provide a device of the character described in which a floating of the machine tool may be permitted and in a free and smooth manner.

Further objects of the invention are in the provision of a device which will be simple and economical in its parts, the parts permitting ease of assembly and in the construction of a device whereby the rotary movement of the driving member is transmitted to the driven member by the angular faces of a floating member, the said angular faces thereof each being 90 degrees apart.

The invention further consists in the certain construction and combination of parts hereinafter illustrated, described and particularly pointed out in the accompanying specification and claims.

Reference being had to the drawing wherein like reference numerals designate similar parts of reference throughout the various views, Figure 1 is a central section through a holder constructed in accordance with the principles above set forth; Fig. 2 is a horizontal section on the line 2—2 of Fig. 1; and Figs. 3, 4 and 5 are perspective details of the driving, floating and driven members, respectively.

The device as shown comprises a driving head 1 provided with a spindle 2 by means of which it may be secured to the machine. The head 1 is provided with a flanged portion 3 upon the bottom of which are driving lugs 4, having their driving faces 5 diametrically opposed to each other or at an angle of 180 degrees. A floating driving plate or recessed disk 6 provided with driving faces 7 lies between the driving head 1 and a driven head 8 and the opposite faces 9 of the driving plate 6 are in turn engaged by the faces 10 of the lugs 11 extending upwardly from the driven head 8. It will be noted that the faces 10 are also diametrically opposed to each other. The heads 1 and 8 together with the driving plate 6 are secured to each other by means of a connecting sleeve 15 provided with a flange 16 which engages the top face of the flange 3 of the head 1 and is threaded at its lower end upon the threaded portion 17 of the head 8. The head 8 is formed of a casting and is provided with two raised bearing surfaces 8ᵃ and the head is further provided with a socket 18 which is adapted to receive the shank of a cutting tool, said tool being retained in place by the set screw 19. One end of the driving head 1 and the center of the driving plate 6 are provided with openings 22 and 23, respectively for the purpose of centering the same when machining.

If the nut 15 is slightly loosened, it will be noted the head 1 being fixed at its center the head 8 is permitted to float and accommodate itself to any inaccuracies in alining of the material to be machined and by the provision of the driving plate 6 a right angle drive is obtained between the heads 1 and 8 as indicated by the dotted lines *a—a* and *b—b* of Fig. 2.

It is evident that if the center of the head 1 is in axial alinement with the head 8 and effectively locked in that position by the clamping nut 15 the tool may serve the uses of the ordinary tool holder.

While I have illustrated and described in detail this particular form of device I am aware that the same is subject to considerable variations in structural details and all coming within the scope of my invention and I desire it to be understood as claiming the same specifically as well as broadly within the scope of the appended claims.

I claim:

1. A floating tool holder, comprising driving and driven members, each having lugs with radial driving surfaces on their opposed faces, a floating connecting member located between said faces and having peripheral recesses with radial walls into which said lugs project, and an outer screw coupling member connecting the driving and driven members.

2. A floating tool holder comprising driving and driven members, each having lugs with radial driving surfaces on their opposed faces, a floating connecting disk located between said faces and having recesses with radial walls in the outer edge thereof into each of which one of the lugs on each of said members projects, and an outer coupling sleeve connecting said members.

3. A floating tool holder comprising driving and driven members, each having a pair of diametrically opposite lugs on their opposed faces, said lugs on the two members projecting beside each other into the same plane, a floating connecting disk located between said faces and having diametrically opposite recesses in the outer edge thereof, into each of which recesses one lug of each of said members projects, and an outer coupling sleeve connecting said members.

4. A floating tool holder, comprising opposed driving and driven members each having diametrically opposite lugs with radial driving surfaces thereon, a floating connecting disk located between said members and having recesses with radial walls into which said lugs project, the lugs and disk having faces to engage each other, said faces on the respective lugs and disk being diametrically opposite each other, and an outer coupling between the driving and driven members.

5. A floating tool holder, comprising opposed driving and driven members each having diametrically opposite lugs thereon, a floating connecting disk located between said members and having recesses into which said lugs project, the lugs and disk having radial faces to engage each other, said faces on the respective lugs and disk being diametrically opposite each other, and an outer coupling between the driving and driven members.

6. A floating tool holder comprising driving and driven members, a floating connecting member between the same, all of said members having radial engaging faces, located in the same plane of rotation, and an outer coupling between the driving and driven members.

In testimony whereof, I do affix my signature in presence of two witnesses.

FREDERICK W. STRAEHLE.

Witnesses:
JOHN A. BOMMHARDT,
ROBERT L. BRUCK.